(12) United States Patent
Bohn

(10) Patent No.: US 6,437,335 B1
(45) Date of Patent: Aug. 20, 2002

(54) HIGH SPEED SCANNER USING MULTIPLE SENSING DEVICES

(75) Inventor: David D Bohn, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/612,337

(22) Filed: Jul. 6, 2000

(51) Int. Cl.⁷ .................................................. G01T 1/20
(52) U.S. Cl. ............................. 250/360.1; 250/208.1; 250/231.16
(58) Field of Search ............................. 250/368, 360.1, 250/208.1, 208.6, 231.16

(56) References Cited

U.S. PATENT DOCUMENTS

| | | | | |
|---|---|---|---|---|
| 4,371,897 A | * | 2/1983 | Kramer | 358/294 |
| 5,834,782 A | * | 11/1998 | Schick et al. | 250/370.11 |
| 5,861,628 A | * | 1/1999 | Genna et al. | 250/368 |
| 5,872,364 A | * | 2/1999 | Strommer | 250/370.09 |
| 6,062,746 A | * | 5/2000 | Stoebe et al. | 396/575 |

\* cited by examiner

Primary Examiner—Kiet T. Nguyen

(57) ABSTRACT

An apparatus for increasing the speed at which an object can be optically scanned. First and second optical signals from first and second areas of an object are focused respectively onto first and second optical sensor arrays. Image data signals from first and second optical sensor arrays are interlaced in a detection circuit to form a composite image of the object. By exposing the first area during the time that the optical signal from exposure of the second area is being clocked out and by exposing the second area during the time that the optical signal from exposure of the first area is being clocked out, the object can be scanned at a faster rate. Specialized image sensors do not need to be developed. Commercially available image sensors can be used. In particular, increased scan speed could result from placing two relatively inexpensive, commercially available Charge Coupled Devices (CCD's) or Complementary Metal-Oxide-Semiconductor (CMOS) image sensors parallel to each other and alternatively exposing near-by areas of the object.

20 Claims, 7 Drawing Sheets

HIGH SPEED SCANNER USING MULTIPLE SENSING DEVICES

FIELD OF THE INVENTION

The present invention relates generally to scanning devices and, more particularly, to CCD image scanners.

BACKGROUND OF THE INVENTION

The speed at which a scanning device can be operated is limited by several factors. One of the more important of these factors is the rate at which image data can be clocked out of the scanning device's image sensor. In a typical scanning application, a linear image sensor is moved horizontally across a sheet of paper. As the image sensor is moved, the optically sensitive elements of the image sensor are exposed to successive areas of the page, and the signals generated within the optically sensitive elements by exposure to these areas is successively transferred out of the optically sensitive elements into associated processing electronics. In such typical applications, the speed at which a page can be scanned is limited among other things by the speed at which exposure and signal transfer can be effected.

In the competitive market of optical scanning devices, a device capable of a faster scan of an object such as a page of paper would provide an advantage. Thus, there is a need for a device having the ability to optically scan an object faster than is presently available.

SUMMARY OF THE INVENTION

An apparatus is disclosed for increasing the speed at which an object can be optically scanned. Optical signals from different small areas of an object are focused respectively onto different optical sensor arrays. Image data signals from these optical sensor arrays are interlaced in a detection circuit to form a composite image of the object, which could be for example a sheet of paper. By exposing one of the small areas during the time that the optical signal from exposure of another small area is being clocked out and by exposing the other area during the time that the optical signal from exposure of the first small area is being clocked out, the object can be scanned at a faster rate. Specialized image sensors do not need to be developed. Commercially available image sensors can be used. In particular, increased scan speed could result from placing two relatively inexpensive, commercially available Charge Coupled Devices (CCD's) or Complementary Metal-Oxide-Semiconductor (CMOS) image sensors parallel to each other and alternatively exposing near-by areas of the object.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

Figure 1:
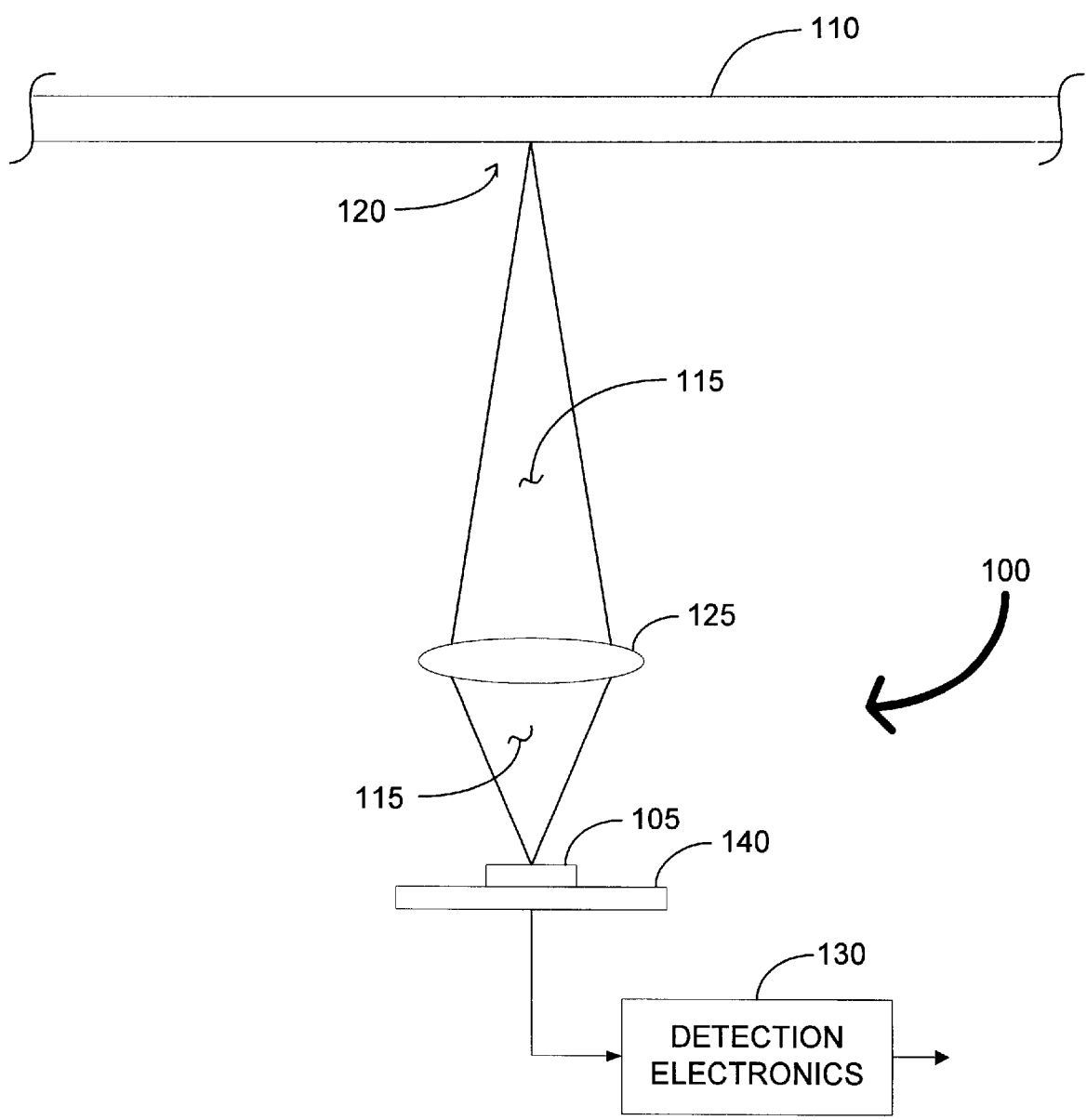
FIG. 1 is a drawing of an optical detection system as described in various representative embodiments of the present patent document.

As shown in the drawings for purposes of illustration, the present patent document relates to a novel apparatus for increasing the speed at which an object can be optically scanned. The speed at which previous scanning systems have been able to scan a given object have been typically limited by the use of a single image sensor and the associated speed at which image data can be detected and clocked out of the scanning device's image sensor. In the following detailed description and in the several figures of the drawings, like elements are identified with like reference numerals.

FIG. 1 is a drawing of an optical detection system 100 as described in various representative embodiments of the present patent document. In the typical application of FIG. 1, the optical detection system 100 comprises an optical sensor array 105 mounted on a scan head 140 which is moved relative to an object 110 which could be, for example, a sheet of paper 110. The optical sensor array 105 could be, for example, a linear array of photosensitive devices fabricated using Charge Coupled Device (CCD) technology or Complementary Metal-Oxide-Semiconductor (CMOS) technology. An optical signal 115 from an area 120 of the object 110 is focused via a lens 125 onto the optical sensor array 105. An electronic image of the object 110 is formed by moving the optical sensor array 105 relative to the object 110 thereby exposing successive small areas of the object 110 to the optical sensor array 105. Image data from successive small areas of the object 110 is transferred from the optical sensor array 105 to detection electronics 130. An image of the object is formed by combining the image data from the various small areas 120 of the object 110. One of the factors that can limit the speed at which the object 110 is scanned is the time required to accumulate image data in the optical sensor array 105 and transfer that data from the optical sensor array 105 to the detection electronics 130.

Figure 2:
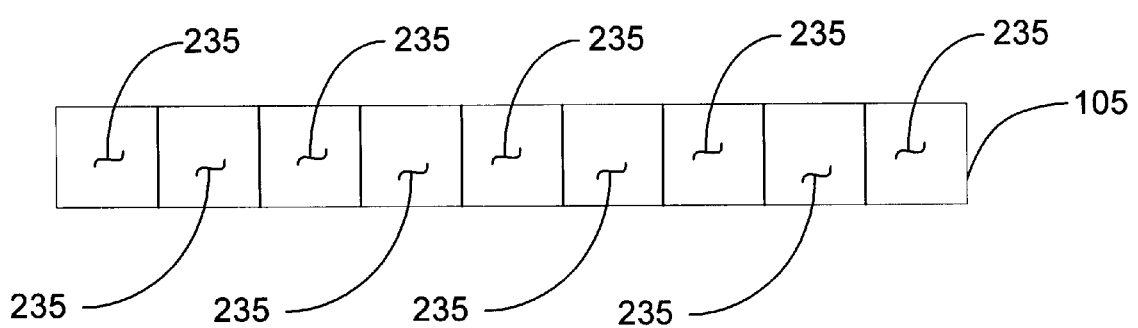
FIG. 2 is a drawing of an optical sensor array as described in various representative embodiments of the present patent document.

FIG. 2 is a drawing of the optical sensor array 105 as described in various representative embodiments of the present patent document. In the representative embodiment, the optical sensor array 105 comprises a linear array of more than one photosensitive devices 235. It is also possible to use other configurations for the optical sensor array 105 including an area array.

Figure 3:
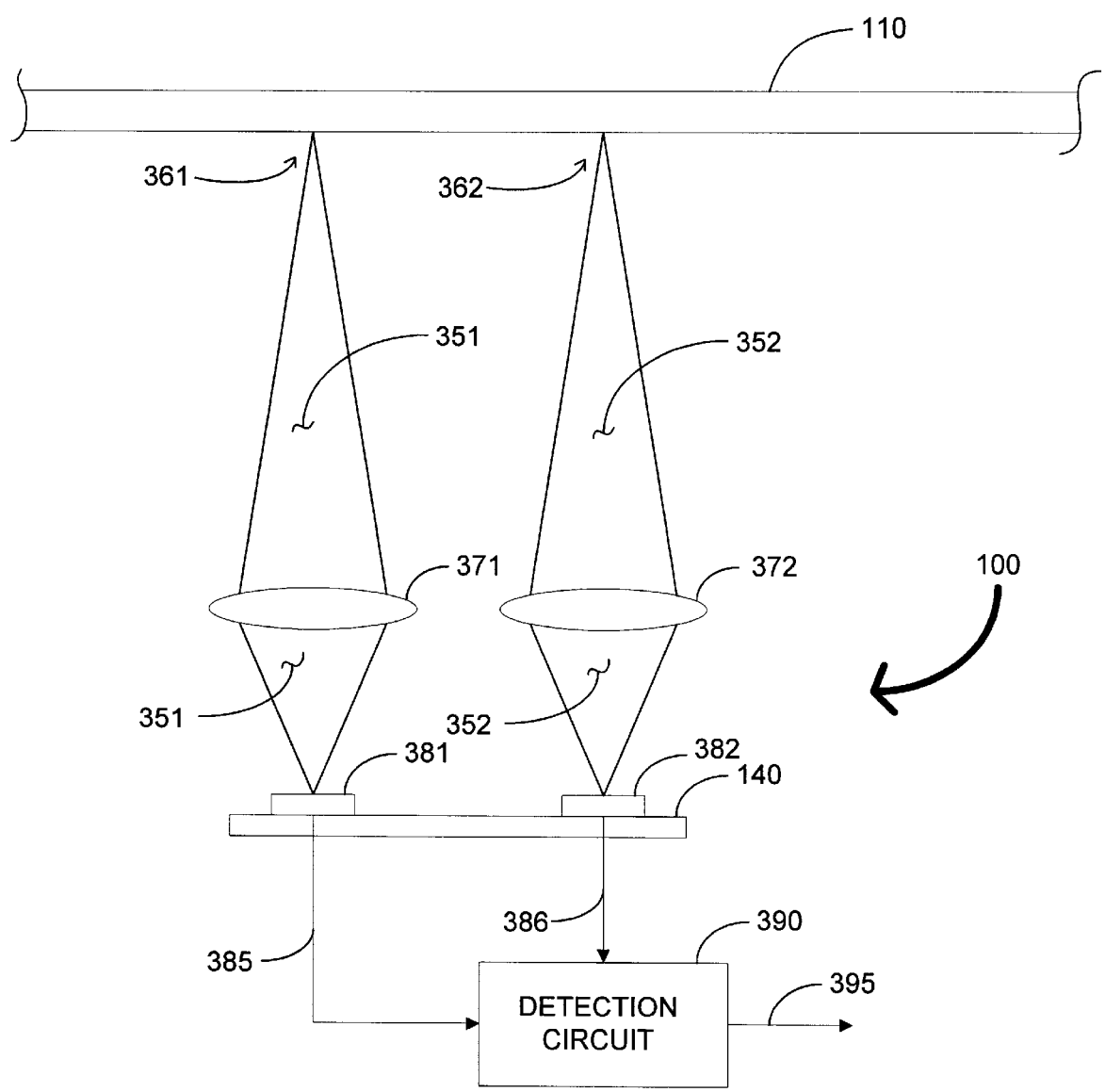
FIG. 3 is a drawing of another optical detection system as described in various representative embodiments of the present patent document.

FIG. 3 is a drawing of another optical detection system 100 as described in various representative embodiments of the present patent document. In the representative embodiment of FIG. 3, a first optical signal 351 from a first area 361 of the object 110 is focused via a first lens 371 onto a first optical sensor array 381. Also in FIG. 3, a second optical signal 352 from a second area 362 of the object 110 is focused via a second lens 372 onto a second optical sensor array 382. First and second optical sensor arrays 381,382 could be, for example, linear arrays of photosensitive devices fabricated using Charge Coupled Device (CCD) technology or Complementary Metal-Oxide Semiconductor (CMOS) technology. Image data from first and second areas 361,362 of the object 110 is transferred from first and second optical sensor arrays 381,382 to a detection circuit 390. First and second optical sensor arrays 381,382 are both typically mounted onto scan head 140. A composite electronic image of the object 110 is formed by moving first and second optical sensor arrays 381,382 relative to the object 110 thereby exposing successive small first and second areas 361,362 of the object 110 to respectively first and second optical sensor arrays 381,382. Image data, shown in FIG. 3 as first and second image data signals 385,386, from successive small first and second areas 361,362 of the object 110 is transferred from respectively first and second optical sensor arrays 381,382 to the detection circuit 390. In the detection circuit 390, first and second image data signals 385,386 are combined to form a composite image data signal 395. An image of the object 110 is formed by interlacing the image data from the various small first and second areas 361,362 of the object 110. By appropriately interlacing signals from successive first and second areas 361,362 the speed at which the object 110 is scanned is improved over the time that is required to accumulate image data using a single optical sensor array 105. Techniques for appropriately combining data from first and second optical signals 351, 352 would be known to one of ordinary skill in the art.

Figure 4:
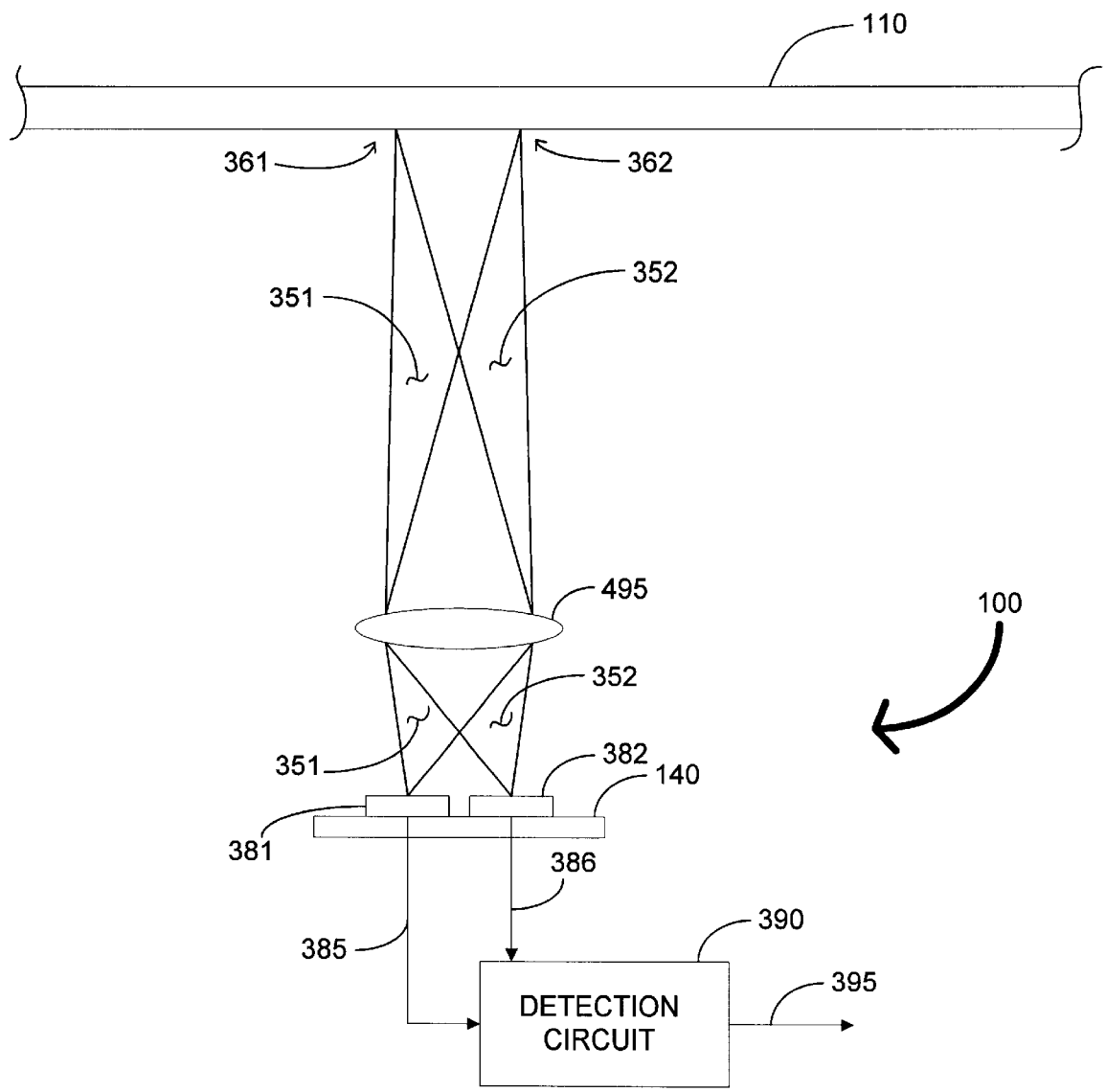
FIG. 4 is a drawing of yet another optical detection system as described in various representative embodiments of the present patent document.

FIG. 4 is a drawing of yet another optical detection system 100 as described in various representative embodiments of the present patent document. In the representative embodiment of FIG. 4, a single lens 495 is used to focus first and second optical signals 351,352 onto respectively first and second optical sensor arrays 381,382. In a representative embodiment, first and second optical sensor arrays 381,382 are located close enough together and single lens 495 is located such that a light source 401, not shown in the figures, illuminates both first and second areas 361,362 simultaneously. Again, first and second optical sensor arrays 381, 382 are both typically mounted onto scan head 140. In a manner similar to that of FIG. 3, image data in FIG. 4 from first and second areas 361,362 of the object 110 is transferred from first and second optical sensor arrays 381,382 to detection circuit 390. First and second optical sensor arrays 381,382 are both typically mounted onto scan head 140. A composite electronic image of the object 110 is formed by moving first and second optical sensor arrays 381,382 relative to the object 110 thereby exposing successive small first and second areas 361,362 of the object 110 to respectively first and second optical sensor arrays 381,382. Image data, shown in FIG. 4 as first and second image data signals 385,386, from successive small first and second areas 361, 362 of the object 110 is transferred from respectively first and second optical sensor arrays 381,382 to the detection circuit 390. In the detection circuit 390, first and second image data signals 385,386 are combined to form a composite image data signal 395. An image of the object 110 is formed by interlacing the image data from the various small first and second areas 361,362 of the object 110. By appropriately interlacing signals from successive first and second areas 361,362 the speed at which the object 110 is scanned is improved over the time that is required to accumulate image data using a single optical sensor array 105.

Figure 5:
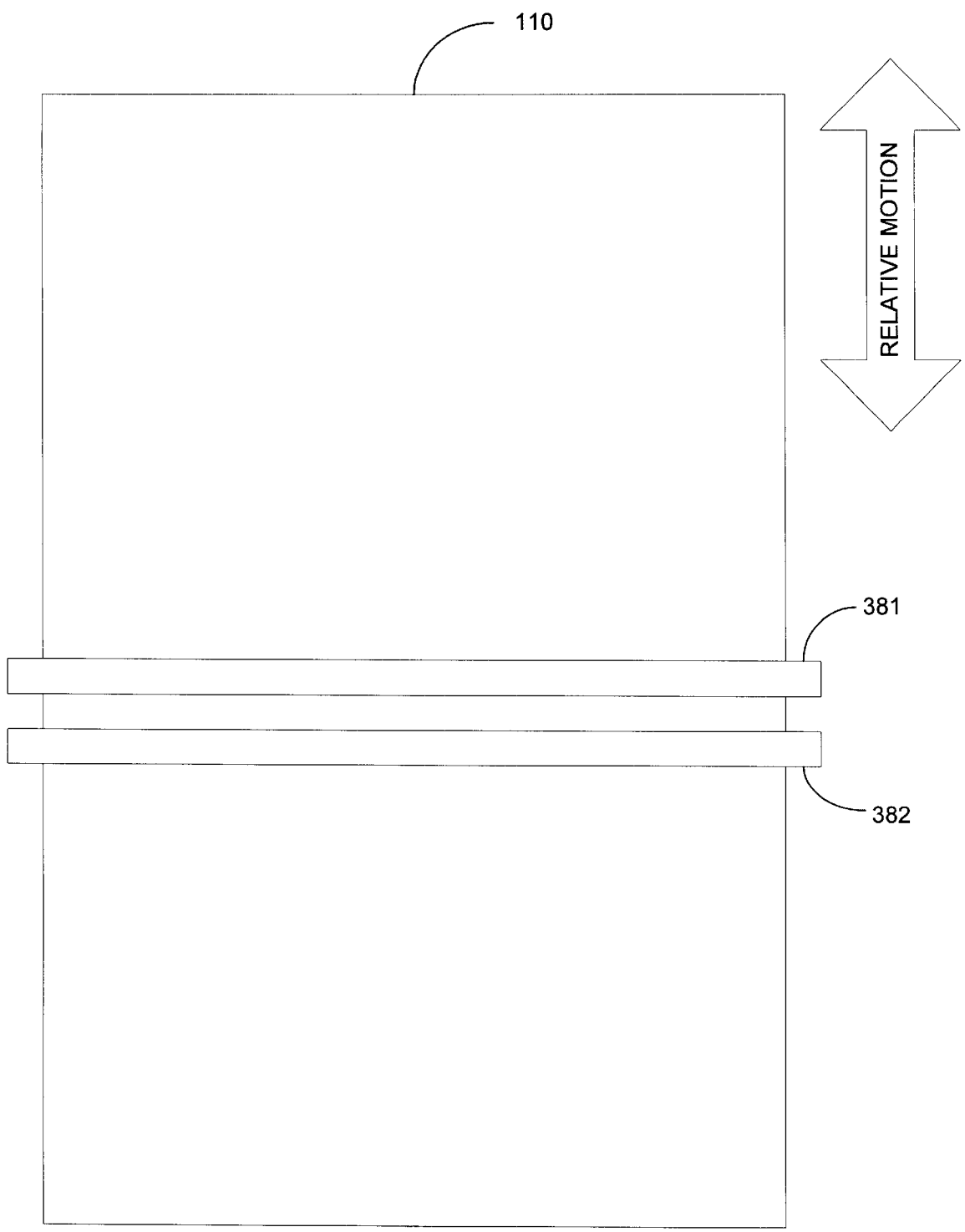
FIG. 5 is a drawing of still another optical detection system as described in various representative embodiments of the present patent document.

FIG. 5 is a drawing of still another optical detection system 100 as described in various representative embodiments of the present patent document. FIG. 5 illustrates a possible configuration of first and second optical sensor arrays 381,382 with respect to the relative direction of motion across the object 110. It will be recognized that it is immaterial to the invention whether (1) first and second optical sensor arrays 381,382 move while the object 110 is stationary, (2) the object 110 moves while first and second optical sensor arrays 381,382 are stationary, (3) first and second optical sensor arrays 381,382 and the object 110 both move, or (4) first and second optical sensor arrays 381,382 and the object 110 are stationary while the lens 495 adjusts to image the various small areas of the object 110 onto the first and second optical sensor arrays 381,382. Other relative locations of first and second optical sensor array 381,382 are also possible. In particular, first and second optical sensor arrays 381,382 could be located beside each other rather than parallel to each other as shown in FIG. 5.

Figure 6:
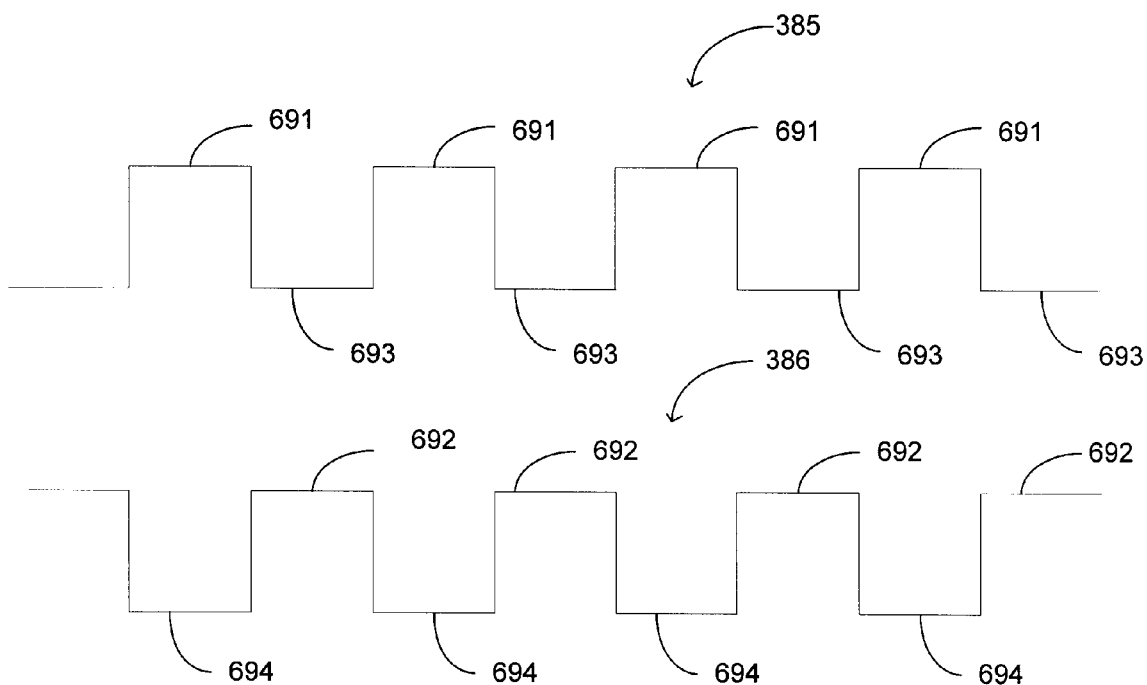
FIG. 6 is a timing diagram for optical detection system as described in various representative embodiments of the present patent document.

FIG. 6 is a timing diagram for optical detection system 100 as described in various representative embodiments of the present patent document. As the scan head 140 moves across the object 110, line images from first and second optical sensor arrays 381,382 are interlaced. The first image data signal 385 resulting from the exposure of the first area 361 comprises a first exposure phase 691 and a first data clocking phase 693. During the first exposure phase 691, the first optical sensor array 381 is exposed to the first optical signal 351, and during the first data clocking phase 693, exposure data collected during the first exposure phase 691 is clocked out of the first optical sensor array 381 in the form of the first image data signal 385 into the detection circuit 390. This cycle is repeated as the first optical sensor array 381 moves across the object 110. The second image data signal 386 resulting from the exposure of the second area 362 comprises a second exposure phase 692 and a second data clocking phase 694. During the second exposure phase 692, the second optical sensor array 382 is exposed to the second optical signal 352, and during the second data clocking phase 694, exposure data collected during the second exposure phase 692 is clocked out of the second optical sensor array 382 in the form of the second image data signal 386 into the detection circuit 390. This cycle is repeated as the second optical sensor array 382 moves across the object 110. Appropriate first exposure phase 691 and second data clocking phase 694 occur at substantially the same time, while appropriate second exposure phase 692 and first data clocking phase 693 occur at substantially the same time. Increased speed results from the above described exposure and data clocking phases and the fact that a given area of the object 110 is only exposed to either the first or second optical sensor arrays 381,382, not both.

Figure 7:
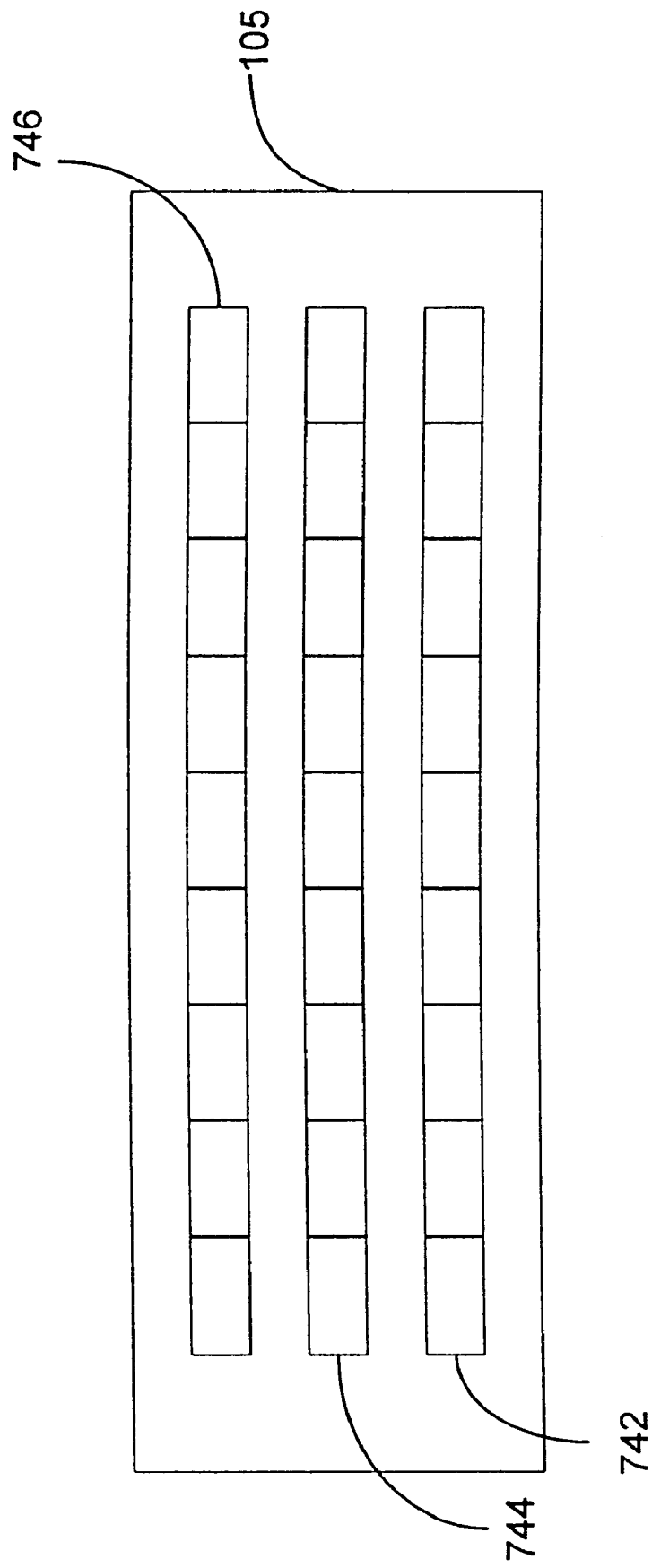
FIG. 7 is a drawing of another optical sensor array as described in various representative embodiments of the present patent document.

FIG. 7 is a drawing of another optical sensor array 105 as described in various representative embodiments of the present patent document. In the representative embodiment of FIG. 7, the optical sensor array 105 comprises first, second, and third photosensitive element rows 742,744,746. In a typical embodiment, the first photosensitive element row 742 would be sensitive to the red spectral frequency band, the second photosensitive element row 744 would be sensitive to the green spectral frequency band, and the third photosensitive element row 746 would be sensitive to the blue spectral frequency band. The configuration shown in FIG. 7 is commonly referred to as a tri-linear photodetector array.

While two optical sensor arrays have been used in the representative embodiments discussed above, the invention is not limited to two. It is also possible to gain increased scanning speed by using more than two optical sensor arrays. Standard commercially available image sensors can be used as the optical sensor arrays to scan the object 110 as disclosed in the present patent document.

A primary advantage of the embodiment as described in the present patent document over prior optical detection systems is the increased scan speed which is possible. A further advantage is that specialized image sensors do not need to be developed. Commercially available image sensors can be used. In particular, increased scan speed could result from placing two relatively inexpensive, commercially available CCD's parallel to each other and alternatively exposing near-by areas of the object.

While the present invention has been described in detail in relation to representative embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A method for detecting an optical image, which comprises the steps of:
   during a first time phase:
      moving a scan head relative to an object such that a first optical signal from a first area of the object falls onto a first optical sensor array mounted on the scan head and a second optical signal from a second area of the object falls onto a second optical sensor array mounted on the scan head; and
      transferring a first image data signal from the first optical sensor array to a detection circuit, wherein the first image data signal results from exposure of the first optical sensor array by first optical signal during time phase immediately prior to the first time phase and simultaneously exposing the second optical sensor array to the second optical signal;
   during a second time phase:
      moving the scan head relative to the object, such that new first optical signal from new first area of the object falls onto the first optical sensor array and new second optical signal from new second area of the object falls onto the second optical sensor array; and
      transferring a second image data signal from the second optical sensor array to the detection circuit, wherein the second image data signal results from exposure of the second optical sensor array by second optical signal during the first time phase and simultaneously exposing the first optical sensor array to first optical signal, wherein first optical signal is from the new first area; and
   forming a composite image data signal from the first and second image data signals by the detection circuit.

2. A method as recited in claim 1, wherein the object is a sheet of paper.

3. A method as recited in claim 1, wherein the first and second optical sensor arrays are selected from the group consisting of Charge Coupled Devices and Complementary Metal-Oxide-Semiconductor image sensors.

4. A method as recited in claim 1, wherein first and second optical sensor arrays are linear image sensors.

5. A method as recited in claim 4, wherein first and second optical sensor arrays comprise at least two photosensitive element rows, wherein the photosensitive element rows have different spectral responses.

6. A method for detecting an optical image, which comprises the steps of:
   during a first time phase:
      moving a scan head relative to an object such that a first optical signal from a first area of the object falls onto a first optical sensor array mounted on the scan head and a second optical signal from a second area of the object falls onto a second optical sensor array mounted on the scan head; and
      transferring a first image data signal from the first optical sensor array to a detection circuit, wherein the first image data signal results from exposure of the first optical sensor array by first optical signal during time phase immediately prior to the first time phase and simultaneously exposing the second optical sensor array to the second optical signal;
   during a second time phase:
      moving the object relative to the scan head, such that new first optical signal from new first area of the object falls onto the first optical sensor array and new second optical signal from new second area of the object falls onto the second optical sensor array; and
      transferring a second image data signal from the second optical sensor array to the detection circuit, wherein the second image data signal results from exposure of the second optical sensor array by second optical signal during the first time phase and simultaneously exposing the first optical sensor array to first optical signal, wherein first optical signal is from the new first area; and
   forming a composite image data signal from the first and second image data signals by the detection circuit.

7. A method as recited in claim 6, wherein the object is a sheet of paper.

8. A method as recited in claim 6, wherein the first and second optical sensor arrays are selected from the group consisting of Charge Coupled Devices and Complementary Metal-Oxide-Semiconductor image sensors.

9. A method as recited in claim 6, wherein first and second optical sensor arrays are linear image sensors.

10. A method as recited in claim 9, wherein first and second optical sensor arrays comprise at least two photosensitive element rows, wherein the photosensitive element rows have different spectral responses.

11. An optical detection system, which comprises:
   a scan head;
   a first optical sensor array mounted to the scan head;
   a second optical sensor array mounted to the scan head; and
   a detection circuit,
      wherein during a first time phase:
         the scan head is capable of motion relative to an object such that a first optical signal from a first area of the object falls onto the first optical sensor array and a second optical signal from a second area of the object falls onto the second optical sensor array; and
         the first optical sensor array is capable of transferring a first image data signal to a detection circuit, wherein the first image data signal results from exposure of the first optical sensor array by first optical signal during time phase immediately prior to the first time phase and simultaneously the second optical sensor array is capable of exposure by the second optical signal;
      wherein during a second time phase:
         the scan head is capable of motion relative to the object such that new first optical signal from new first area of the object falls onto the first optical sensor array and new second optical signal from new second area of the object falls onto the second optical sensor array; and the second optical sensor array is capable of transferring a second image data signal to the detection circuit, wherein the second image data signal results from exposure of the second optical sensor array by second optical signal during the first time phase and simultaneously the first optical sensor array is capable of exposure by the first optical signal, wherein the first optical signal is from the new first area; and wherein the detection circuit is capable of forming a composite image data signal from the first and second image data signals.

12. An optical detection system as recited in claim 11, wherein the object is a sheet of paper.

13. An optical detection system as recited in claim 11, wherein the first and second optical sensor arrays are selected from the group consisting of Charge Coupled Devices and Complementary Metal-Oxide-Semiconductor image sensors.

14. An optical detection system as recited in claim 11, wherein first and second optical sensor arrays are linear image sensors.

15. An optical detection system as recited in claim 14, wherein first and second optical sensor arrays comprise at least two photosensitive element rows, wherein the photosensitive element rows have different spectral responses.

16. An optical detection system, which comprises:

a scan head;

a first optical sensor array mounted to the scan head;

a second optical sensor array mounted to the scan head; and a detection circuit, wherein during a first time phase:

the first optical sensor array is capable of having a first optical signal falling on it from a first area of an object, wherein the object is capable of movement relative to the scan head;

the second optical sensor array is capable of receiving a second optical signal from a second area of the object, wherein the object is capable of movement relative to the scan head; and the first optical sensor array is capable of transferring a first image data signal to a detection circuit, wherein the first image data signal results from exposure of the first optical sensor array by first optical signal during time phase immediately prior to the first time phase and simultaneously the second optical sensor array is capable of exposure by the second optical signal;

wherein during a second time phase:

the first optical sensor array is capable of receiving new first optical signal from new first area of the object, wherein the object is capable of movement relative to the scan head;

the second optical sensor array is capable of having new second optical signal falling on it from new second area of the object, wherein the object is capable of movement relative to the scan head; and the second optical sensor array is capable of transferring a second image data signal to the detection circuit, wherein the second image data signal results from exposure of the second optical sensor array by second optical signal during the first time phase and simultaneously the first optical sensor array is capable of exposure by the first optical signal, wherein the first optical signal is from the new first area; and wherein the detection circuit is capable of forming a composite image data signal from the first and second image data signals.

17. An optical detection system as recited in claim 16, wherein the object is a sheet of paper.

18. An optical detection system as recited in claim 16, wherein the first and second optical sensor arrays are selected from the group consisting of Charge Coupled Devices and Complementary Metal-Oxide-Semiconductor image sensors.

19. An optical detection system as recited in claim 16, wherein first and second optical sensor arrays are linear image sensors.

20. An optical detection system as recited in claim 19, wherein first and second optical sensor arrays comprise at least two photosensitive element rows, wherein the photosensitive element rows have different spectral responses.

* * * * *